(12) United States Patent
Grau

(10) Patent No.: US 9,835,759 B2
(45) Date of Patent: Dec. 5, 2017

(54) NEUTRON-INDUCED GAMMA-RAY SPECTROSCOPY THAT ACCOUNTS FOR ENVIRONMENTAL DEPENDENCE OF INELASTIC GAMMA-RAY EMISSION SPECTRA

(71) Applicant: SCHLUMBERGER TECHNOLOGY CORPORATION, Sugar Land, TX (US)

(72) Inventor: James A. Grau, Marshfield, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/954,799

(22) Filed: Nov. 30, 2015

(65) Prior Publication Data
US 2017/0153354 A1    Jun. 1, 2017

(51) Int. Cl.
*G01V 5/10* (2006.01)
(52) U.S. Cl.
CPC .................. *G01V 5/101* (2013.01)
(58) Field of Classification Search
CPC .......... G01V 99/00; G01V 11/00; G01V 5/10; G01V 5/101; G01V 5/104
See application file for complete search history.

(56) References Cited

U.S. PATENT DOCUMENTS

| | | | |
|---|---|---|---|
| 4,390,783 A | 6/1983 | Grau | |
| 4,394,574 A | 7/1983 | Grau et al. | |
| 4,464,569 A * | 8/1984 | Flaum ............... | G01V 5/102 |
| | | | 250/269.6 |
| 5,369,578 A | 11/1994 | Roscoe et al. | |
| 5,440,118 A | 8/1995 | Roscoe | |
| 2014/0231640 A1 | 8/2014 | Grau et al. | |
| 2015/0076337 A1 | 3/2015 | Roscoe et al. | |

FOREIGN PATENT DOCUMENTS

WO    WO2012162478 A2    11/2012

* cited by examiner

*Primary Examiner* — David Porta
*Assistant Examiner* — Faye Boosalis

(57) ABSTRACT

A method and system for analyzing constituent elements in bulk media wherein neutrons are emitted into the bulk media to produce inelastic neutron interaction in the bulk media, and a gamma-ray spectrum resulting from the inelastic neutron interaction in the bulk media is detected. A set of standard spectra are used as part of spectral analysis that processes the standard spectra and the derived gamma-ray spectrum to determine a number of yield coefficients for the constituent elements as part of the bulk media. The standard spectra or the spectral analysis is configured to account for at least one environmental condition that affects detected gamma-rays that result from the inelastic neutron interaction in the bulk media.

30 Claims, 12 Drawing Sheets

NEUTRON-INDUCED GAMMA-RAY SPECTROSCOPY THAT ACCOUNTS FOR ENVIRONMENTAL DEPENDENCE OF INELASTIC GAMMA-RAY EMISSION SPECTRA

BACKGROUND

1. Field

The present application relates to neutron-induced gamma-ray spectroscopy in bulk media, particularly for elemental analysis.

2. State of the Art

When fast neutrons are used to induce inelastic neutron interaction that excites gamma rays in bulk media for the purpose of measuring elemental concentrations, the spectrum of gamma rays produced by each element can depend on the properties of the bulk media, especially on the hydrogen content. If no attempt is made to account for this dependency, the elemental concentrations so extracted will be inaccurate.

SUMMARY

A method and system is provided for analyzing constituent elements in bulk media wherein neutrons are emitted into the bulk media to produce inelastic neutron interaction in the bulk media, and a gamma-ray spectrum resulting from the inelastic neutron interaction in the bulk media is detected. A set of standard spectra is used as part of spectral analysis that processes the standard spectra and the derived gamma-ray spectrum to determine a number of yield coefficients for the constituent elements as part of the bulk media. The standard spectra or the spectral analysis is configured to account for at least one environmental condition that affects the detected gamma rays that result from the inelastic neutron interaction in the bulk media. The yield coefficients can be stored in computer memory for subsequent analysis.

The spectral analysis can utilize a first set of baseline standard spectra corresponding to the constituent elements as well as at least one second set of difference standard spectra corresponding to the constituent elements. The at least one second set of difference standard spectra can represent a change to the first set of baseline standard spectra resulting from change in a predefined environmental condition that affects the detected gamma rays relative to the environment where the first set of baseline standard spectra is obtained. The at least one second set of difference standard spectra can be selected from difference standard spectra corresponding to different changes in environmental condition.

In some embodiments, the spectral analysis can use the second set of difference standard spectra to adjust the first set of baseline standard spectra to produce a set of adjusted standard spectra, and the adjusted standard spectra can then be used to determine the combination of spectra for the constituent elements that best fits the derived gamma-ray spectrum resulting from the inelastic neutron interaction in the bulk media.

In some embodiments, the first set of baseline standard spectra can be used to determine the combination of spectra for the constituent elements that best fits the derived gamma-ray spectrum resulting from the inelastic neutron interaction in the bulk media in order to derive a weighting matrix W and a set of yield coefficients for the constituent elements. A vector of contribution biases can be generated from the second set of difference standard spectra and the weighting matrix W. The vector of contribution biases for the constituent elements can then be used to adjust the set of yield coefficients for the constituent elements.

In some embodiments, the first set of baseline standard spectra can be used to determine the combination of spectra for the constituent elements that best fits the derived gamma-ray spectrum resulting from the inelastic neutron interaction in the bulk media in order to derive a set of yield coefficients for the constituent elements. A number of vectors of contribution biases can be pre-computed from difference standard spectra corresponding to different changes in environmental condition. One or more of the pre-computed vectors corresponding to the environment of the derived gamma ray spectrum can be selected and used to adjust the set of yield coefficients for the constituent elements.

The constituent elements can be selected from the group including carbon, oxygen, silicon, calcium, iron, sulfur, magnesium, aluminum, barium, and sodium chloride.

The environmental condition that affects the detected gamma rays and that is accounted for in the standard spectra or spectral analysis can affect the detected gamma rays at the point of their creation, possibly in their path to the detector, or at some other location. This environmental condition can be some property of the bulk media, and itself is not restricted to be at the point of creation of the gamma rays. For example, this environmental condition can be the porosity of the bulk media. In some examples, this environmental condition can represent an aspect of the measurement environment.

In some embodiments, the method and/or system can provide for downhole analysis of a geological formation.

Further features and aspects of example embodiments of the present invention are described in more detail below with reference to the appended Figures.

DETAILED DESCRIPTION

Figure 1:
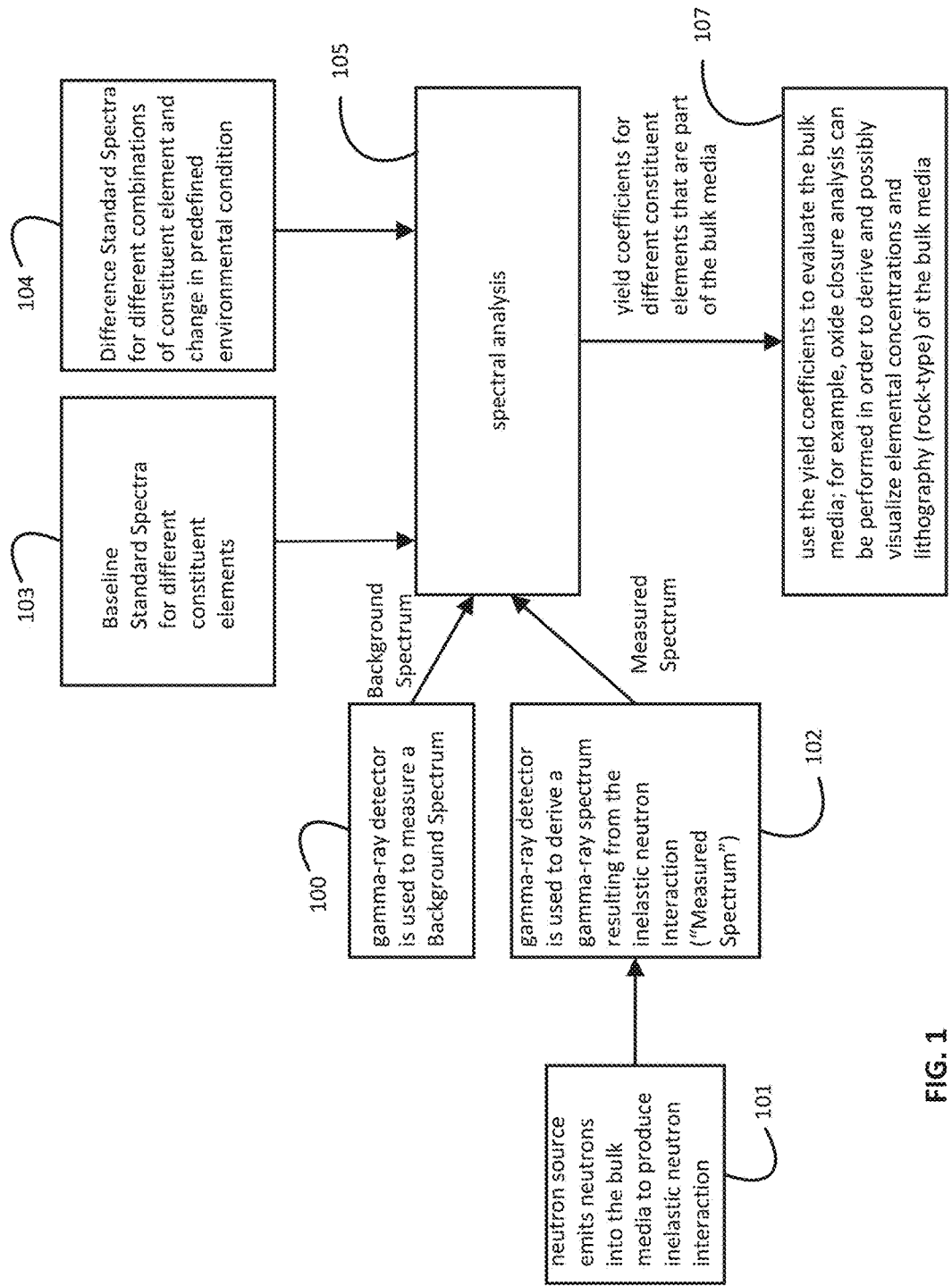
FIG. 1 is a high level schematic diagram illustrating an exemplary workflow for analyzing bulk media using neutron-induced gamma-ray spectroscopy.

The following description provides example embodiments only, and is not intended to limit the scope, applicability, or configuration of the disclosure. Rather, the following description of the example embodiments will provide those skilled in the art with an enabling description for implementing one or more example embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The embodiments of the present application as described herein analyze constituent elements in bulk media by emitting neutrons into the bulk media to produce inelastic neutron interaction in the bulk media, and detecting a gamma-ray spectrum resulting from the inelastic neutron interaction in the bulk media (referred to herein as a "measured spectrum"). The analysis can further employ two sets of gamma-ray spectra for a number of possible constituent elements that can be part of a bulk media under investigation. The first set of gamma-ray spectra is referred to herein as "baseline standard gamma-ray spectra" (or "baseline standard spectra") and the second set of gamma-ray spectra is referred to herein as "difference standard gamma-ray spectra" (or "difference standard spectra"). The baseline standard spectrum for a given constituent element represents a baseline gamma-ray spectral response that is attributable to the given constituent element for a predefined environmental condition of the measured gamma rays. The difference standard spectrum for a given constituent element represents a change (or difference) to the baseline gamma-ray spectral response for the given constituent element, where the change (or difference) accounts for a variation in the predefined environmental condition relative to the environment from which the baseline spectral response is measured. The variation in environmental condition can affect the detected gamma rays at the point of their creation, possibly in their path to the detector, and/or at some other location. This environmental condition can be some property of the bulk media, and itself is not restricted to be at the point of creation of the gamma rays. In some examples, the environmental condition can be the porosity of the bulk media. In some examples, the environmental condition can represent an aspect of the measurement environment.

The example embodiments of the present application as described herein can employ a background spectrum that primarily represents the contribution of the bulk media (and possibly the activation of the measurement apparatus, such as the scintillator crystal) under normal conditions when there is no inelastic neutron interaction in the bulk media.

Before describing in greater detail the example embodiments of the present application, it is instructive to generally discuss the underlying theory upon which the spectral analysis employed by such embodiments is based.

The baseline standard spectra and the difference standard spectra can be defined as histograms each having an abscissa (typically referred to as the "energy axis") which is divided into m equal-width energy intervals (where i=1, 2, ..., m). The ordinate for the $i^{th}$ energy interval is a gamma-ray count ($n_i$) for that energy interval. The baseline standard spectra can also be defined by m-dimensional vectors where the components, $p_i$, of a given m-dimensional vector p are relative intensities at the m equal-width energy intervals where such relative intensities are derived by normalizing the gamma-rays counts ($n_i$) over the m energy intervals. In this case, the sum of the relative intensities for the m components of a given m-dimensional vector p is unity.

In general, without taking into account any changes in environmental condition(s), a measured gamma-ray spectrum (measured spectrum) can be described as a linear combination of a complete set of baseline standard spectra, $p_j$ (where j=1, 2, ..., s). Each of these baseline standard spectra correspond to a constituent element expected to be present in the bulk media under investigation. To generate the set of baseline standard spectra for the s different constituent elements, inelastic gamma-ray spectra can be measured in specialized bulk media samples in a laboratory setting where such specialized bulk media samples are selected to enhance the spectral contribution of each given constituent element. Examples of constituent elements that can be part of the set of different constituent elements include carbon, oxygen, silicon, calcium, iron, sulfur, magnesium, aluminum, barium, and sodium chloride.

The m-dimensional vectors that represent the set of s baseline standard spectra can be represented mathematically by column vectors of an m by s spectra-descriptor matrix, ρ, such that:

$$U = \sum_{j=1}^{S} p_j X_j = \rho \cdot X, \quad (1)$$

where X is a vector whose components are the yield coefficients $X_j$ (j=1, 2, ..., s). Each $X_j$ represents the fractional contribution from the corresponding baseline standard spectrum vector, $p_j$ to a measured spectrum U.

In order to determine the yield coefficients $X_j$ that represent the contribution of each constituent element to the measured spectrum U, it is not possible in general to invert p in order to solve for X (to give the yield coefficients $X_j$) since the matrix ρ is not square (e.g., m>s). Also, the measured spectrum U can contain statistical errors which can be represented by including an error spectrum c in Eqn. 1 as follows:

$$U = \sum_{j=1}^{S} p_j X_j + \epsilon = \rho \cdot X + \epsilon. \quad (2)$$

By selecting a suitable positive symmetric weighting matrix, W, the weighted statistical error squared is given as:

$$\epsilon^T W \epsilon = (U - \rho X)^T W (U - \rho X), \quad (3)$$

where
$\epsilon^T$ is the transpose of $\epsilon$, and
$\epsilon^T W \epsilon$ is a number which measures the overall error.

The weighted-least-squares solution which minimizes the error of Eqn. 3 is given by:

$$X = (\rho^T W \rho)^{-1} \rho^T W \cdot U. \quad (4)$$

In order to derive the weighted-least squares solution, the magnitude of the measured spectrum U over a large number of energy channels can be best fit to a composite spectrum formed by combining the baseline standard spectra $p_j$ in a manner that normalizes the baseline standard spectra $p_j$ relative to one another by yield (or amplitude) such that the composite spectrum represents the relative proportions of the constituent elements.

In some embodiments, the best fit analysis can be configured to remove the contribution of the background spectrum from the measured spectrum and match certain parameters representative of the conditions under which the background spectrum, measured spectrum, and the composite spectrum have been obtained. Such parameters can include gain, offset, background subtraction factor (hereafter referred to as BSF) and the resolution degradation factor (hereafter referred to as RDF). The gain and offset parameters are characteristic of the electronic components used to obtain the background spectrum, the measured spectrum and the baseline standard spectra that form the composite spectrum. RDF is a parameter representative of the effects, on the detector measurements, of the variation from one detector to the other, or of the count rates effects due to the processing electronics downstream from the detector, or finally of the temperature effects which can be of importance in the oil well logging applications where the differences in temperature between the laboratory environment (where the measurements that form the composite spectrum are obtained) and the borehole environment (where the measured spectrum is acquired) can be extreme. This list of parameters is not exhaustive and e.g. a further parameter may be a parameter representative of the non-linearity of the gain.

The best fit analysis can be carried out through a number of numerical methods. One possible numerical method involves minimizing a function of the measured spectrum, background spectrum, and the composite spectrum while simultaneously modifying the above mentioned parameters and elemental yields. By way of example, the function that is minimized can be of form:

$$\chi^2 = \sum_i \frac{\left( \sum_{j=1}^{S} X_j p_j^i(\alpha) + bB^i(\beta) - U^i \right)^2}{V^i}, \quad (5)$$

where
the superscript i represents the energy channels of the respective spectra,
$X_1$ is the elemental yield for the $j^{th}$ constituent element,
$p_1$ is the baseline standard spectrum for the $j^{th}$ constituent element,
α represent the changes to gain, offset and RDF as applied to the composite spectrum such that these parameters match those of the measured spectrum,
b is the BSF,
B is the background spectrum,
β represents changes to the gain, offset and RDF as applied to the background spectrum such that these parameters match those of the measured spectrum,
U is the measured spectrum, and
V is the variance spectrum, which can be represented as the inverse of the weighting matrix W (1/W).

The function of Eqn. 5 represents the weighted sum of the squares of the deviation of the fitting function (the composite spectrum) from the measured function (measured spectrum). The function of Eqn. 5 can be solved using a non-linear solving method, such as Marquardt's method, in to determine the elemental yield coefficients $X_j$ associated with the spectra together with the corrections to the gain, offset, and RDF as needed as well as the BSF. Details of this numerical method are provided in U.S. Pat. No. 5,369,578, herein incorporated by reference in its entirety. Other suitable numerical methods can also be used.

The embodiments of the present application can also employ one or more sets of difference standard spectra, $d_j$ (j=1, 2, . . . , s) that correspond to the baseline standard spectra, $p_j$ (U=1, 2, . . . , s). Each of these difference standard spectra correspond to a constituent element expected to be present in the bulk media under investigation as well as to a change in the predefined environmental condition that affects the detected gamma rays relative to the environment from which the baseline spectral response is measured. In practice, the difference standard $d_j$ acts as a perturbation to the baseline standard $p_j$ to reflect the detected spectral response $p'_j$ to element j in an environment differing from the baseline environment. That spectral response can be expressed as:

$$p'_j = (p_j + \alpha_j d_j)/(1+\alpha_1) \quad (6)$$

where $\alpha_j$ is the ratio of the detected spectral contribution from the difference standard to the contribution from the baseline standard. The difference standard $d_j$ can be computed from $p'_j$ and $p_j$ via spectral stripping techniques described mathematically in Eqn. 7 below. The stripping factor $\beta_j$ can be somewhat arbitrary, but once determined the value of $\alpha_1$ associated with that second environment will also be determined. Further, $$d_j = (p'_j - \beta_j p_j)/(1-\beta_j) \quad (7)$$

where $\beta_j = 1/(1+\alpha_1)$ and thus $\alpha_1 = (1-\beta_j)/\beta_j$

Thus, the difference standard spectra $d_j$, together with their relative contribution factors $\alpha_1$, represent a change (or difference) to the corresponding baseline spectra $p_j$ for the given constituent element j, where the change (or difference) accounts for the change in the predefined environmental condition. One aspect will include a prediction of the relative contribution factors $\alpha_j$ based on known or measured parameters of the environment, such as porosity. When multiple sets of difference standard spectra $d_j$ are used, each set of difference standard spectra can correspond to a different change in the predefined environmental condition. Examples of change in predefined environmental condition represented by the difference standard spectra $d_j$ include variations in porosity of the bulk media under investigation, variations in an aspect of the measurement environment (such as the borehole size for downhole measurements, tool positioning within the borehole, and the presence of gas in the borehole or formation). To generate the difference standard spectra $d_j$, inelastic gamma-ray spectra are measured in a laboratory setting where the bulk media samples or the environment of the experiment are selected or controlled to emphasize the changes in predefined environmental condition for the given constituent element. For example, in order to generate multiple sets of difference standard spectra $d_j$ that account for variation in porosity of the bulk media under investigation, inelastic gamma-ray spectra can be measured in a laboratory setting for the bulk media samples of the s different constituent elements at varying predefined porosities. The difference between the baseline gamma-ray spectrum for a given constituent element and the inelastic gamma-ray spectra of a given constituent element at the varying predefined porosities can be computed to derive the difference standard spectra that corresponds to the given constituent element and a number of possible predefined changes in the porosities relative to porosity of the baseline spectrum.

Furthermore, the embodiments of the present application can incorporate the baseline standard spectra $p_j$ as well as the difference standard spectra $d_j$ into the spectral analysis of the measured spectrum in order to more accurately derive yield coefficients for different constituent elements in a manner that accounts for change in environmental condition that affects the detected gamma rays.

FIG. 1 is a flow chart illustrating a workflow that carries out gamma-ray spectroscopy on a bulk media. The workflow begins in block 100 where a gamma-ray detector is used to measure a background spectrum B that primarily represents the contribution of the bulk media (and possibly the activation of the gamma-ray detector, such as the scintillator crystal) under normal conditions when there is no inelastic neutron interaction in the bulk media. In block 101, a neutron source emits neutrons into the bulk media at sufficient energy to produce inelastic neutron interaction in the bulk media. In block 102, the gamma-ray detector is used to derive a gamma-ray spectrum (referred to herein as a "measured spectrum") that results from the inelastic neutron interaction produced in block 101. In detecting the measured spectrum, well-known techniques can be employed to reduce or eliminate neutron capture background from the measured spectrum. In block 105, spectral analysis is carried out that uses the baseline standard spectra $p_j$ for different constituent elements (labeled 103) as well as the difference standard spectra $d_j$ for different combinations of constituent element and change in predefined environmental condition (labeled 104) and the background spectrum B measured in block 100 in order to process the measured spectrum derived in block 102 and solve for yield coefficients for different constituent elements that are part of the bulk media. Note that the baseline standard spectra $p_j$ as well as the difference standard spectra $d_j$ can be derived prior to the measured spectrum and stored in computer memory for subsequent analysis as needed. The standard spectra or the spectral analysis is configured to account for at least one environmental condition that affects the detected gamma-rays that result of the inelastic neutron interaction in the bulk media. This environmental condition can affect the detected gamma rays at the point of their creation, possibly in their path to the detector, or at some other location. This environmental condition can be some property of the bulk media, and itself is not restricted to be at the point of creation of the detected gamma rays. In some examples, this environmental condition can be the porosity of the bulk media. In some examples, this environmental condition can represent an aspect of the measurement environment. The yield coefficients can be stored in computer memory for subsequent analysis. In block 107, the yield coefficients that result from the spectral analysis of block 105 can be used to evaluate the bulk media. In some examples, oxide closure analysis can be performed as part of block 107 in order to derive and possibly visualize elemental concentrations and lithography (rock type) of the bulk media.

Figure 2:
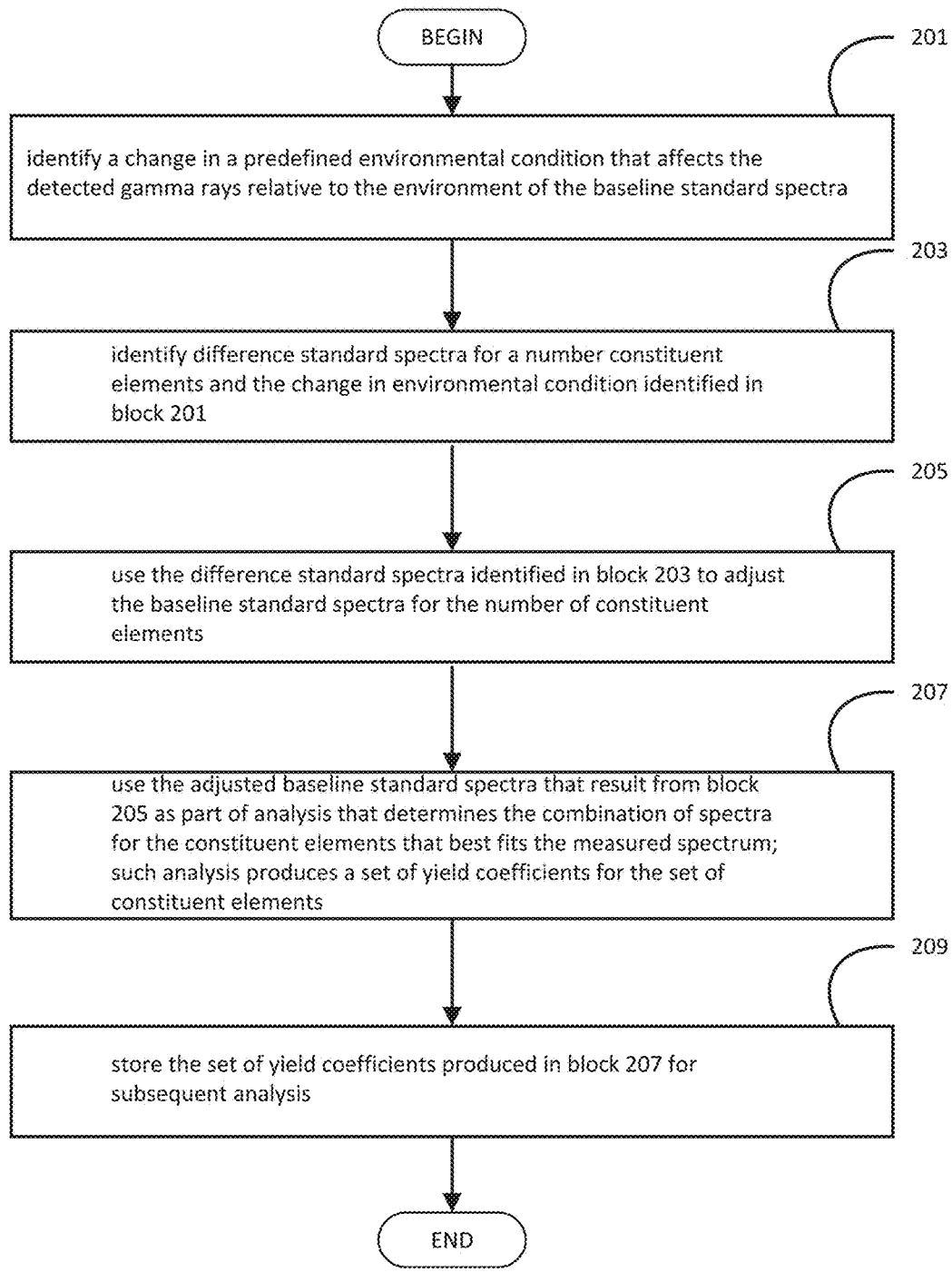
FIG. 2 is a schematic diagram of a spectral analysis that can be carried out as part of the workflow of FIG. 1 according to a first embodiment of the present application.

FIG. 2 is a flow chart illustrating operations that can be carried out as part of the spectral analysis of block 105 of FIG. 1. These operations are particularly useful where sufficient information is available during the spectral analysis in order to accurately predict the change in predefined environmental condition that affects the detected gamma rays relative to the environment in which the baseline standard spectra $p_j$ were obtained.

In block 201, the operations identify a change in the predefined environmental condition that affects the detected gamma rays measured in block 102 relative to the environment in which the baseline standard spectra $p_j$ were obtained. This change in environmental condition can affect the detected gamma rays at the point of their creation, possibly in their path to the detector, or at some other location. This change in environmental condition can be some property of the bulk media, and itself is not restricted to be at the point of creation of the gamma rays. For example, this change environmental condition can be a change in the porosity of the bulk media. In some examples, this change in environmental condition can represent an aspect of the measurement environment. The operations of block 201 can be manual or automatic in nature and possibly based on the results of additional testing or other data.

In block 203, the operations select difference standard spectra $d_j$ and the corresponding contribution factors $\alpha_1$ for the s different constituent elements that match the change in environmental condition identified in block 201. In block 205, the operations use the difference standard spectra $d_j$ and the corresponding contribution factors $\alpha_j$ selected in block 203 to adjust the baseline standard spectra $p_j$ for the s different constituent elements. In some examples, the difference standard spectrum vector $d_j$ can be subtracted from the corresponding baseline spectrum vector $p_j$ for each given constituent element j (j=1, 2, ..., s) as described in Eqn. 6.

Note that the difference standard spectra $d_j$ selected in block 203 is expected to produce an adjusted baseline standard spectra in block 205 that will more accurately reflect the predicted environmental condition when obtaining the measured spectrum in block 102 and thus lead to the derivation of more accurate results (e.g., yield coefficients). For example, consider a case where the bulk media under investigation (from which the measured spectrum is obtained in block 102) has porosity at or near 30% porosity/30-PU and the baseline standard spectra $p_j$ are obtained from elemental samples at or near 16% porosity/16-PU. In this case, the difference standard spectra $d_j$ selected in block 203 would be derived from the difference between the baseline standard spectra $p_j$ (which are obtained from elemental samples at or near 16% porosity/16-PU) and the standard spectra obtained from elemental samples at or near 30% porosity/30-PU. This selection would be expected to produce an adjusted baseline standard spectra in block 205 that would more accurately reflect the predicted environmental condition (the porosity of the bulk media at or near 30% porosity/30-PU) when obtaining the measured spectrum in block 102 and thus lead to the derivation of more accurate results (e.g., yield coefficients In block 207, the operations use the adjusted baseline standard spectra $p_j'$ that result from block 205 as part of analysis that determines the combination of spectra for the constituent elements that best fits the measured spectrum derived in block 102. Such analysis produces the set of element yield coefficients $X_1$.

In some embodiments, the analysis of block 207 derives the weighted-least squares solution to Eqn. 4 by fitting the magnitude of the measured spectrum over a large number of energy channels to a composite spectrum formed by combining the adjusted baseline standard spectra $p_j'$ in a manner that normalizes the adjusted baseline standard spectra $p_j'$ relative to one another by yield (or amplitude) such that the composite spectrum represents the relative proportions of the constituent elements. In this case, the spectra-descriptor matrix p is represented by the m-dimensional vectors that represent the set of s adjusted baseline standard spectra $p_j'$.

Such best fit analysis can be configured to remove the contribution of the background spectrum from the measured spectrum and match certain parameters representative of the conditions under which the background spectrum, measured spectrum and the composite spectrum have been obtained as described above. For example, the function of Eqn. 5 can be solved using a non-linear solving method, such as Marquardt's method, in to determine the elemental yield coefficients $X_j$ associated with the spectra together with the corrections to the gain, offset, and RDF as needed as well as the BSF as described above. Other suitable numerical methods can also be used.

In block 209, the set of elemental yield coefficients $X_j$ produced in block 207 can be stored in computer memory for subsequent analysis, such as the analysis of block 107.

Figure 3:
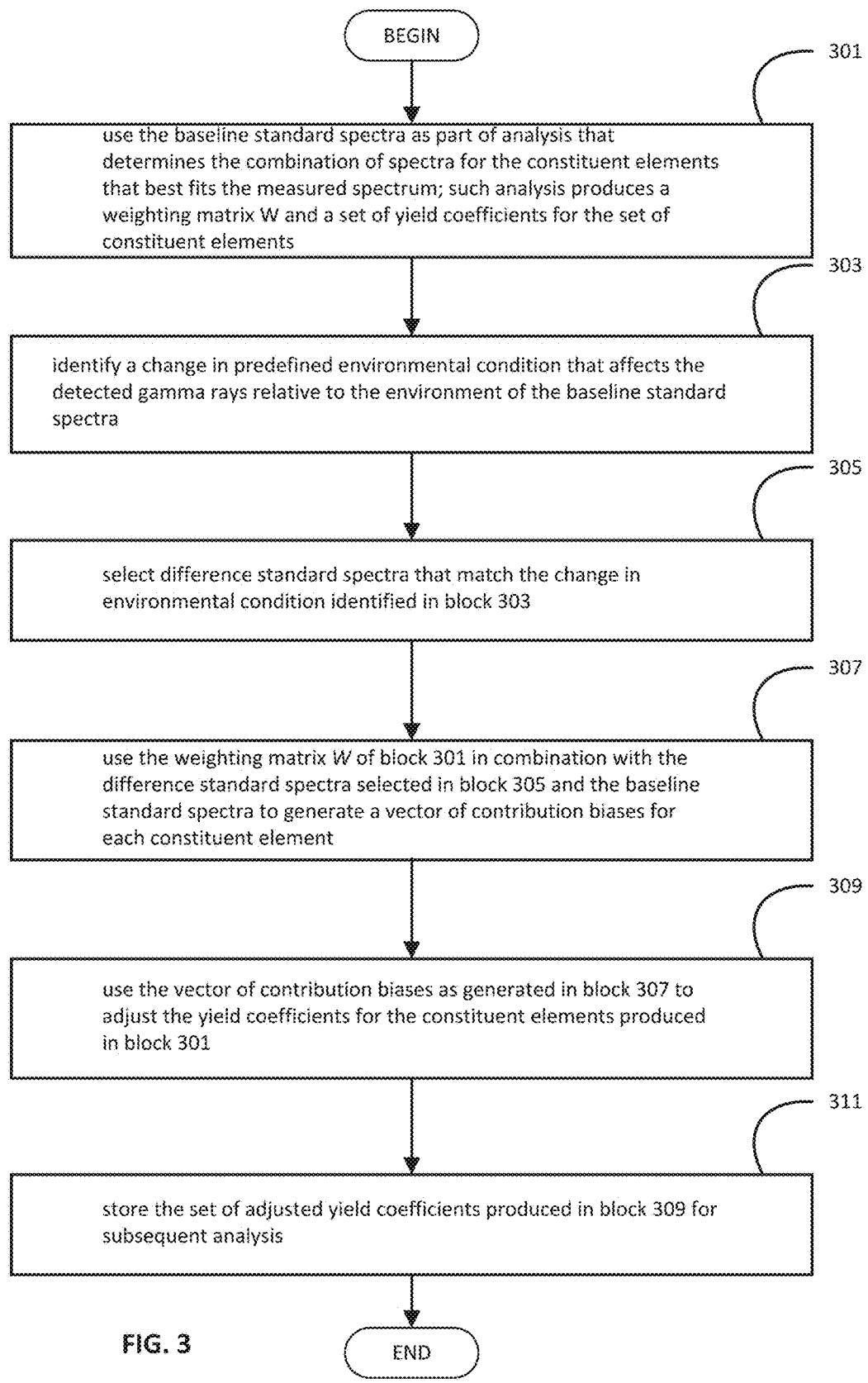
FIG. 3 is a schematic diagram of a spectral analysis that can be carried out as part of the workflow of FIG. 1 according to a second embodiment of the present application.

FIG. 3 is a flow chart illustrating operations that can be carried out as part of the spectral analysis of block 105 of FIG. 1. These operations are particularly useful where sufficient information is not available during the spectral analysis in order to accurately predict the predefined environmental variation that affects the detected gamma rays relative to the environment in which the baseline standard spectra $p_j$ were obtained.

In block 301, the operations use the baseline standard spectra $p_j$ as part of analysis that determines the combination of spectra for the constituent elements that best fits the measured spectrum derived in block 102. Such analysis produces the weighting matrix W and the set of elemental yield coefficients $X_j$.

In some embodiments, the analysis of block 301 derives the weighted-least squares solution to Eqn. 4 by fitting the magnitude of the measured spectrum over a large number of energy channels to a composite spectrum formed by combining the baseline standard spectra $p_j$ in a manner that normalizes the baseline standard spectra $p_j$ relative to one another by yield (or amplitude) such that the composite spectrum represents the relative proportions of the constituent elements. In this case, the spectra-descriptor matrix p is represented by the m-dimensional vectors that represent the set of s baseline standard spectra $p_j$. Such best fit analysis can be configured to remove the contribution of the background spectrum from the measured spectrum and match certain parameters representative of the conditions under which the background spectrum B, the measured spectrum and the composite spectrum have been obtained as described above. For example, the function of Eqn. 5 can be solved using a non-linear solving method, such as Marquardt's method, in to determine the weighting matrix W and the elemental yield coefficients $X_j$ associated with the spectra together with the corrections to the gain, offset, and RDF as needed as well as the BSF as described above. Other suitable numerical methods can also be used.

In block 303, the operations identify a change in predefined environmental condition that affects the detected gamma rays (measured in block 102) relative to the environment where the baseline standard spectra $p_j$ were obtained. This change in environmental condition can affect the detected gamma rays at the point of their creation, possibly in their path to the detector, or at some other location. This change in environmental condition can be some property of the bulk media, and itself is not restricted to be at the point of creation of the gamma rays. For example, this change environmental condition can be a change in the porosity of the bulk media. In some examples, this change in environmental condition can represent an aspect of the measurement environment. The operations of block 303 can be manual or automatic in nature and possibly based on the results of additional testing or other data.

In block 305, the operations select difference standard spectra $d_j$ for the s different constituent elements that match the change in environmental condition identified in block 303. Note that the difference standard spectra $d_j$ selected in block 305 would be expected to produce an adjusted baseline standard spectra (according to the operations of block 205) that would more accurately reflect the predicted environmental condition when obtaining the measured spectrum in block 102. For example, consider a case where the bulk media under investigation (from which the measured spectrum is obtained in block 102) has porosity at or near 30% porosity/30-PU and the baseline standard spectra $p_j$ are obtained from elemental samples at or near 16% porosity/16-PU. In this case, the difference standard spectra $d_j$ selected in block 305 would be derived from the difference between the baseline standard spectra $p_j$ (which are obtained from elemental samples at or near 16% porosity/16-PU) and standard spectra obtained from elemental samples at or near 30% porosity/30-PU. This selection would be expected to produce an adjusted baseline standard spectra (according to the operations of block 205) that would more accurately reflect the predicted environmental condition (the porosity of the bulk media at or near 30% porosity/30-PU) when obtaining the measured spectrum in block 102.

In block 307, the operations use the weighting matrix W derived in block 301 in combination with the difference standard spectra $d_j$ selected in block 305 and the baseline standard spectra $p_j$ to generate a vector e of contribution biases for each one of the s constituent elements. This vector e can be calculated for each difference standard spectrum d using the weighted-least-squares solution as follows:

$$e=(\rho^T W \rho)^{-1} \rho^T W \cdot d \qquad (8)$$

where
p is a baseline standard spectrum belonging to $p_1$, and
d is a difference standard spectrum belonging to $d_j$ selected in block 305 and is equal to $\alpha_j X_j d_j$.

In block 309, the operations use the vector e of contribution biases for the constituent elements as generated in block 307 to adjust the yield coefficients $X_j$ for the s constituent elements produced in block 301. For example, the vector of elemental yield coefficients $X_j$ can be replaced by the vector of elemental yield coefficients $X_j'$ such that:

$$X_j'=X_j-e. \qquad (9)$$

It is expected that the adjustments provided by the vector e of contribution biases for the constituent elements will more accurately reflect the predicted environmental condition when obtaining the measured spectrum in block 103 and thus lead to the derivation of more accurate results (e.g., yield coefficients).

In block 311, the set of adjusted yield coefficients X' produced in block 309 can be stored in computer memory for subsequent analysis, such as the analysis of block 107.

Figure 4:
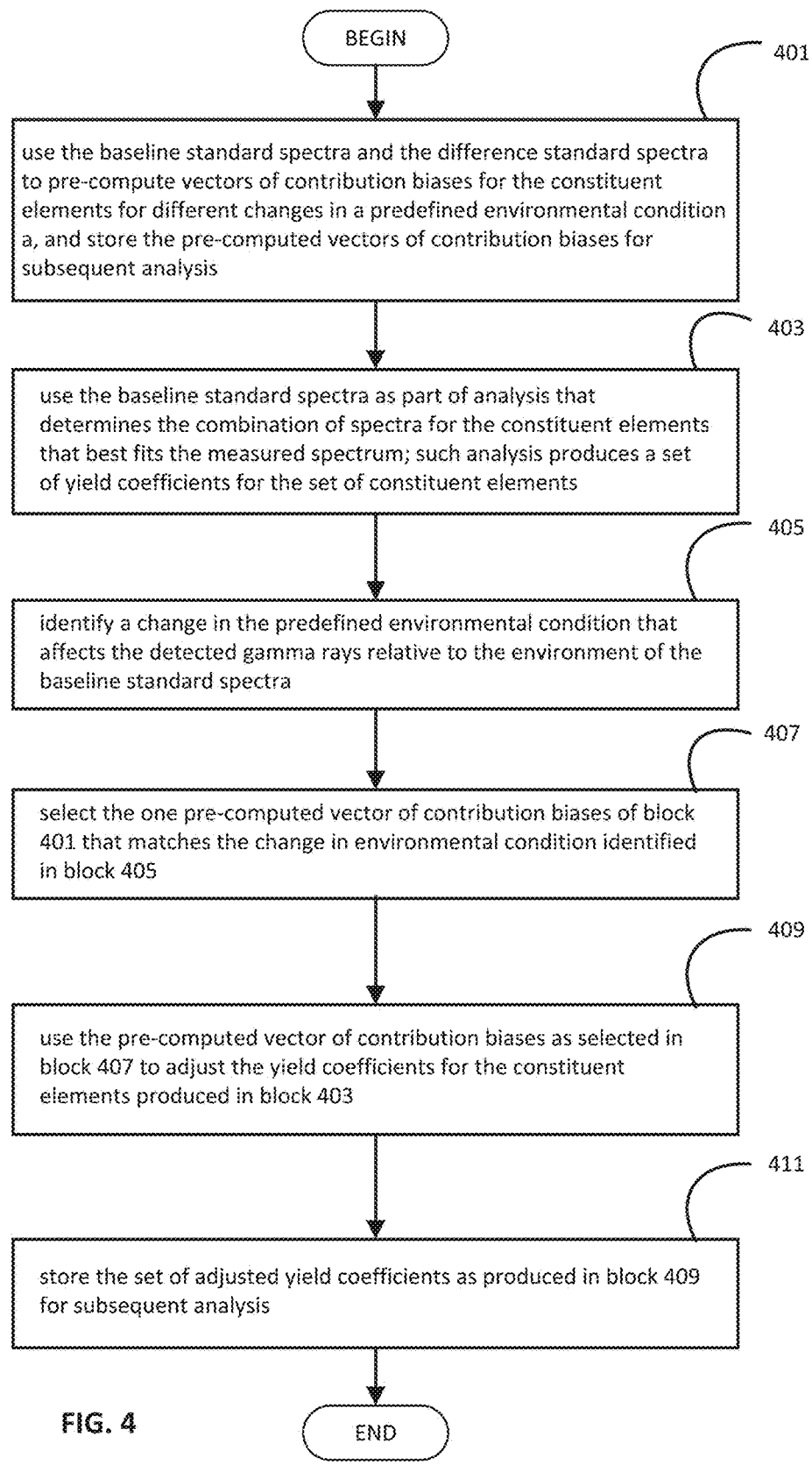
FIG. 4 is a schematic diagram of a spectral analysis that can be carried out as part of the workflow of FIG. 1 according to a third embodiment of the present application.

FIG. 4 is a flow chart illustrating operations that can be carried out as part of the spectral analysis of block 105 of FIG. 1. These operations are particularly useful where i) sufficient information is not available during the spectral analysis in order to accurately predict the predefined environmental variation that affects the detected gamma rays relative to the environment in which the baseline standard spectra $p_j$ were obtained, and where ii) the weighting matrix W does not vary significantly with variation in the environment of the measured gamma rays.

In block 401, the operations use the baseline standard spectra $p_j$ and the difference standard spectra $d_j$ to pre-compute vectors of contribution biases for the s constituent elements for different predefined variations in environmental condition relative to the environment in which the baseline standard spectra $p_j$ were obtained. In some embodiments, this can be accomplished by solving Eqn. 8 using a typical weighting matrix W and a unit difference standard d. Such pre-computed vectors can be derived prior to the measurements of block 102 and stored in computer memory for subsequent analysis as needed (e.g., block 407).

In block 403, the operations use the baseline standard spectra $p_j$ as part of analysis that determines the combination of spectra for the constituent elements that best fits the measured spectrum derived in block 102. Such analysis produces a set of element yield coefficients $X_j$.

In some embodiments, the analysis of block 403 derives the weighted-least squares solution to Eqn. 4 by fitting the magnitude of the measured spectrum over a large number of energy channels to a composite spectrum formed by combining the baseline standard spectra $p_j$ in a manner that normalizes the baseline standard spectra $p_j$ relative to one another by yield (or amplitude) such that the composite spectrum represents the relative proportions of the constituent elements. In this case, the spectra-descriptor matrix p is represented by the m-dimensional vectors that represent the set of s baseline standard spectra $p_j$. Such best fit analysis can be configured to remove the contribution of the background spectrum from the measured spectrum and match certain parameters representative of the conditions under which the background spectrum, measured spectrum and the composite spectrum have been obtained as described above. For example, the function of Eqn. 5 can be solved using a non-linear solving method, such as Marquardt's method, in to determine the elemental yield coefficients $X_j$ associated with the spectra together with the corrections to the gain, offset, and RDF as needed as well as the BSF as described above. Other suitable numerical methods can also be used.

In block 405, the operations identify a change in predefined environmental condition that affects the detected gamma rays (measured in block 102) relative to the environment where the baseline standard spectra $p_j$ were obtained. This change in environmental condition can affect the detected gamma rays at the point of their creation, possibly in their path to the detector, or at some other location. This change in environmental condition can be some property of the bulk media, and itself is not restricted to be at the point of creation of the gamma rays. For example, this change environmental condition can be a change in the porosity of the bulk media. In some examples, this change in environmental condition can represent an aspect of the measurement environment. Based on this environmental condition predict $\alpha_1$, the ratio of the difference standard contribution to that of the baseline standard. The operations of block 405 can be manual or automatic in nature and possibly based on the results of additional testing or other data.

In block 407, the operations select the pre-computed vector of unit contribution biases for the s constituent elements as derived in block 401 that matches the change in environmental condition identified in block 405 and multiply these unit contribution biases by the corresponding $\alpha_j X_j$. Note that the pre-computed vector of contribution biases selected in block 407 is derived from the difference standard spectra $d_j$ that would be expected to produce an adjusted baseline standard spectra (according to the operations of block 205) that would more accurately reflect the predicted environmental condition when obtaining the measured spectrum in block 102. For example, consider a case where the bulk media under investigation (from which the measured spectrum is obtained in block 102) has porosity at or near 30% porosity/30-PU and the baseline standard spectra $p_j$ are obtained from elemental samples at or near 16% porosity/16-PU. In this case, the pre-computed vector of contribution biases selected in block 407 would be derived from the difference standard spectra $d_j$ calculated from the difference between the baseline standard spectra $p_j$ (which are obtained from elemental samples at or near 16% porosity/16-PU) and standard spectra obtained from elemental samples at or near 30% porosity/30-PU. This selection would be expected to produce an adjusted baseline standard spectra (according to the operations of block 205) that would more accurately reflect the predicted environmental condition (the porosity of the bulk media at or near 30% porosity/30-PU) when obtaining the measured spectrum in block 102.

In block 409, the operations use the pre-computed vector of contribution biases for the s constituent elements as selected in block 407 to adjust the elemental yield coefficients $X_j$ for the constituent elements produced in block 403. In some embodiments, the computations of Eqn. 9 can be used where the bias vector (e) is the pre-computed vector of contribution biases selected in block 407. It is expected that the adjustments provided by the pre-computed bias vectors for the constituent elements will more accurately reflect the predicted environmental condition when obtaining the measured spectrum and thus lead to the derivation of more accurate results (e.g., yield coefficients).

In block 411, the set of adjusted elemental yield coefficients $X_j'$ produced in block 409 can be stored in computer memory for subsequent analysis, such as the analysis of block 107.

Figure 5:
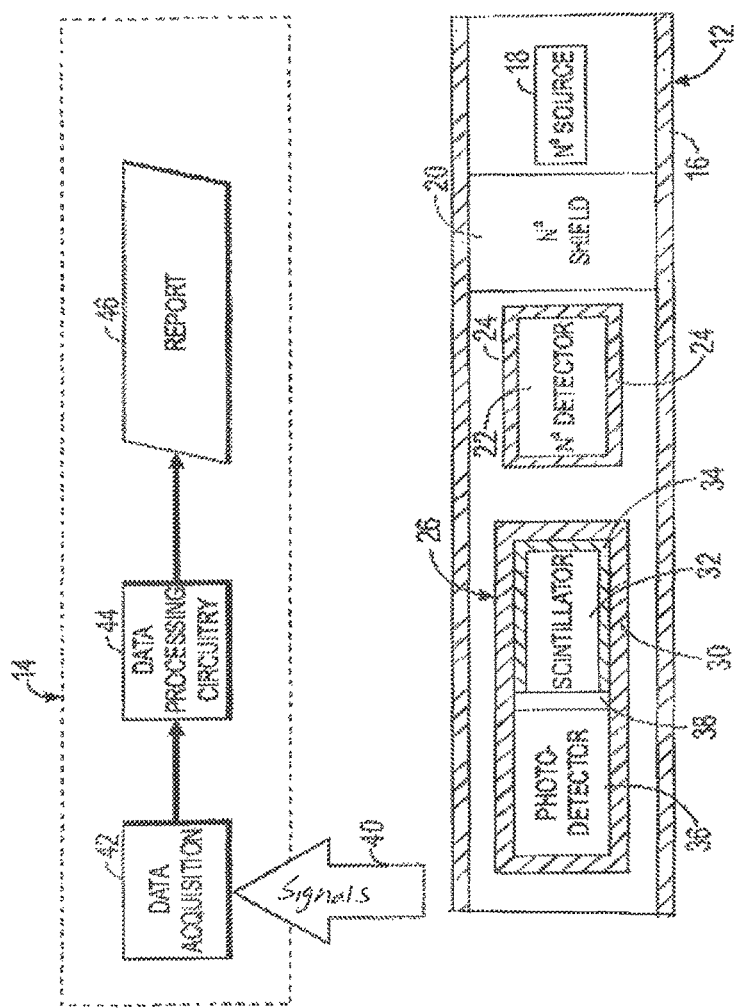
FIG. 5 is a high level schematic diagram of a system for downhole analysis of a geological formation, which can be adapted to carry out the workflow of FIG. 1 for analyzing the elemental constituents of the geological formation.

Some embodiments of the presently disclosed subject matter generally relate to systems and methods for well logging using gamma-rays produced by inelastic scattering events ("inelastic gamma-rays"). Counts or spectra of inelastic gamma-rays may indicate a variety of properties of a surrounding subterranean formation. FIG. 5 illustrates a system for determining formation properties using inelastic gamma-rays, according to some embodiments. The system 10 includes a downhole tool 12 and a data processing system 14. By way of example, the downhole tool 12 may be a slickline or wireline tool for logging an existing well, or may be installed in a borehole assembly for logging while drilling (LWD). The data processing system 14 may be incorporated into the downhole tool 12 or may be at the surface at the wellsite or another remote location.

The downhole tool 12 may be constructed so as to improve detection of gamma-rays produced via inelastic scattering events, while reducing detection of gamma-rays produced via thermal and epithermal neutron capture events. The downhole tool 12 can include a tubular housing 16 that supports a neutron source 18. The tubular housing 16 can be formed from cobalt-free steel or other suitable material. The neutron source 18 may be any suitable neutron source capable of emitting neutrons into a surrounding formation to produce inelastic gamma-rays. By way of example, the neutron source 18 may be a pulsed electronic neutron source, such as a Minitron™ by Schlumberger Technology Corporation. Additionally or alternatively, in certain embodiments, the neutron source 18 may be a radioisotope source capable of emitting fast neutrons. A neutron shield 20 containing elements with high (n,2n) cross sections, such as lead, bismuth or tungsten, may separate the neutron source 18 from various detectors in the downhole tool 12.

In certain embodiments of the downhole tool 12, the housing 16 can also support a neutron detector 22 (such as a 3He neutron detector), which may be surrounded by a thermal neutron shield 24 that serves to block thermal neutrons from reaching the neutron detector 22. The neutron detector 22 can be configured to primarily detect epithermal neutrons rather than thermal neutrons. The housing 16 can also support a neutron monitor (not shown) which is located near the neutron source 18 and detects primarily unscattered neutrons that are emitted directly from the neutron source 18. The neutron monitor, which may be a plastic scintillator and photodetector, provides a count rate signal proportional to the neutron output rate from the neutron source 18. The housing 16 can also support one or more gamma-ray detectors, illustrated in FIG. 1 as a single gamma-ray detector 26. The gamma-ray detector 26 includes a scintillator crystal 32 positioned adjacent a photodetector 36 with an optical window 38 disposed therebetween. The scintillator crystal 32, photodetector 36, and optical window 38 are enclosed within a housing 30. The housing 30 may contain materials (labeled 34), such as lithium carbonate ($Li_2CO_3$) or other suitable material, which can substantially shield the corresponding scintillator crystal 32 from thermal neutrons in order to limit the production of thermal neutron capture gamma-rays by the scintillator crystal 32. The scintillator crystal 32 of the gamma-ray detector 26 can enable detection counts or spectra of gamma-rays by producing light when such gamma-rays are captured by the scintillator crystal 32. Depending on the application, the scintillator crystal 32 may be chosen from a variety of materials as is well known in the art. The photodetector 36 of the gamma-ray detector 26 produces a voltage signal whose magnitude is proportional to the light emitted by the scintillator crystal 32 when gamma-ray radiation is absorbed, once the light has passed through the corresponding optical window 38. Such voltage signal can be processed to obtain a gamma-ray count or spectrum signal.

The signals from the neutron monitor, the neutron detector 22, and the gamma-ray detector 26 (e.g., the output of the photodetector 36) may be transmitted to the data processing system 14. The data processing system 14 may include data acquisition circuity 42 and data processing circuitry 44 as shown. The data processing circuitry 44 can be a microcontroller or microprocessor, such as a central processing unit (CPU), which may execute various routines and processing functions. For example, the data processing circuitry 44 may execute various operating system instructions as well as software routines configured to effect certain processes and stored in or provided by a manufacture including a computer readable-medium, such as a memory device (e.g., a random access memory (RAM) of a personal computer) or one or more mass storage devices (e.g., an internal or external hard drive, a solid-state storage device, CD-ROM, DVD, or other storage device). In addition, the data processing circuitry 44 may process data provided as inputs for various routines or software programs, including the signals 40. Alternatively or additionally, the data processing system 14 may include, among other things, a mainframe computer, a distributed computing system, or an application-specific computer or workstation configured to implement all or part of the present technique based on specialized software and/or hardware provided as part of the system. Further, the data processing system 14 may include either a single processor or a plurality of processors to facilitate implementation of the presently disclosed functionality. Moreover, where a plurality of processors is provided, such processors may be disposed at a shared location (e.g., on a single circuit board and/or in a single enclosure) or at different locations. In some examples, the different processors communicate via a communication network (e.g., an intranet or internet).

Such data associated with the present techniques may be stored in, or provided by, the memory or mass storage device of the data processing system 14. Alternatively or additionally, such data may be provided to the data processing circuitry 44 of the data processing system 14 via one or more input devices. In some embodiments, data acquisition circuitry 42 may represent one such input device; however, the input devices may also include manual input devices, such as a keyboard, a mouse, or the like. In addition, the input devices may include a network device, such as a wired or wireless Ethernet card, a wireless network adapter, or any of various ports or devices configured to facilitate communication with other devices via any suitable communications network, such as a local area network or the Internet. Through such a network device, the data processing system 14 may exchange data and communicate with other networked electronic systems, whether proximate to or remote from the system. The network may include various components that facilitate communication, including switches, routers, servers or other computers, network adapters, communications cables, and so forth.

The downhole tool 12 may transmit the signals 40 to the data acquisition circuitry 42 of the data processing system 14 via, for example, a telemetry system communication downlink or a communication cable to generate data that is processed by data processing circuitry 44. In accordance with one or more stored routines, the data processing circuitry 44 may process the data to ascertain one or more properties of a subterranean formation surrounding the downhole tool 12. Such processing may involve, for example, one or more techniques for removing an epithermal neutron capture background from a gamma-ray count. The data processing circuitry 44 may thereafter output a report 46 indicating the one or more ascertained properties of the formation. The report 46 may be stored in memory or may be provided to an operator via one or more output devices, such as an electronic display and/or a printer.

Figure 6:
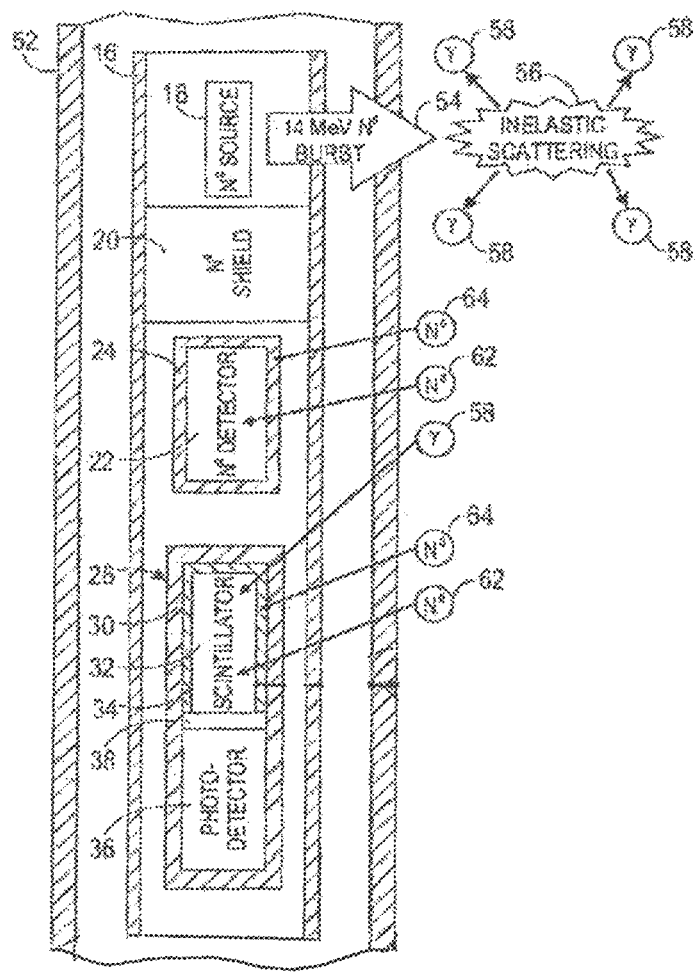
FIG. 6 is a high level schematic diagram illustrating the excitation of inelastic neutron interaction in the geological formation as well as the detection of resulting gamma rays by the downhole tool of FIG. 5.

FIG. 6 illustrates a well-logging operation involving the downhole tool 12 in a surrounding subterranean formation, according to some embodiments. In the operation depicted in FIG. 6, the downhole tool 12 has been lowered into an existing well surrounded by casing 52 in a subterranean formation 50. The well-logging operation may begin when the neutron source 18 outputs a burst of neutrons 54 (for example, having energies of 14.1 MeV or greater) into the surrounding formation 50. Initially, the burst of neutrons 54 may collide with nuclei of the formation 50 in inelastic scattering events 56, which causes inelastic gamma-rays 58 to be emitted and the neutrons of the burst of neutrons 54 to lose energy. Following the inelastic scattering events 56, the neutrons of the burst of neutrons 54 may interact with the formation 50 in elastic scattering events (not shown), which causes the neutrons to drop in energy to eV and sub-eV levels as epithermal neutrons 62 and/or thermal neutrons 64.

The inelastic gamma-rays 58 produced by the inelastic scattering events 56 may subsequently Compton-scatter due to electrons in the formation 50. Some of the inelastic gamma-rays 58 may ultimately be detected in the gamma-ray detector 26, which produces a corresponding voltage signal output by the photodetector 36 of the gamma-ray detector 26. This voltage signal can be processed to produce a gamma ray count or spectra representative of the detected inelastic gamma rays 58. The gamma ray count or spectra representative of the detected inelastic gamma rays is sensitive of various formation properties.

A complication may arise, however, due to the interaction of the neutrons of the neutron burst 54 with hydrogen in the formation 50. Because elastic scattering occurs primarily due to interactions with hydrogen in the formation 50, the number of low-energy epithermal neutrons 62 and thermal neutrons 64 that reach the vicinity of the gamma-ray detector 26 may accordingly be strongly influenced by the hydrogen index of the formation 50. If one of the epithermal neutrons 62 or thermal neutrons 64 were captured by a nucleus at or in the vicinity of the gamma-ray detector 26, a neutron capture event may occur, which can produce a neutron capture gamma-ray that may be detected by the gamma-ray detector 26. Without correction, such neutron capture gamma-rays may completely overwhelm the inelastic gamma-rays 58. For this reason, the downhole tool 12 may contain materials carefully chosen to reduce or eliminate neutron capture events occurring in the downhole tool 12. Moreover, because some neutron capture events may yet still occur in the downhole tool 12, and because some neutron capture events may take place externally to the downhole tool 12, various techniques can be employed to reduce or eliminate any remaining neutron capture background from gamma-ray signals of the gamma-ray detector 26. In particular, the materials chosen and the techniques employed may reduce or eliminate not only thermal neutron capture background, but also epithermal neutron capture background arising from the capture of epithermal neutrons by the scintillator crystal of the gamma-ray detector 26.

The downhole tool 12 and data processing system 14 of FIGS. 5 and 6 can be configured to carry out the various embodiments of the workflows as described herein. In this case, the neutron source 18 of the downhole tool 12 is configured to emit neutrons into the formation (bulk media) in order to produce inelastic neutron interaction and the gamma-ray detector 26 of the downhole tool 12 is used to derive a gamma-ray spectrum resulting from the inelastic neutron interaction. The data processing system 14 can be configured to perform spectral analysis that incorporates the baseline standard spectra as well as the difference standard spectra into the spectral analysis of a measured gamma-ray spectrum resulting from inelastic neutron interaction in order to more accurately derive yield coefficients for different constituent elements in a manner that accounts for environmental variations at the point of creation of the measured gamma rays.

Figure 7:
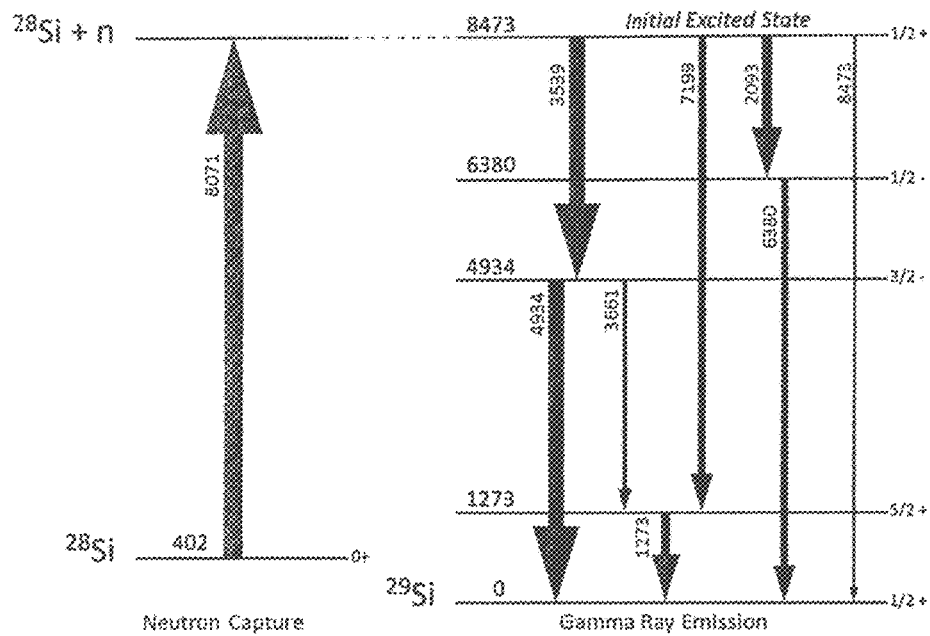
FIG. 7 is an energy band diagram illustrating simplified gamma-ray emission following slow-neutron capture in silicon ($^{28}$Si).

Note that for prompt gamma rays excited by a slow-neutron capture event, it is expected that there should be no changes to the gamma-ray spectra at the point of creation due to changes in the environment. Specifically, after each slow neutron capture event, the product nucleus is left in the same excited state, normally 0-2 keV below the neutron separation energy for the product nucleus. It will then de-excite by emitting gamma rays via hundreds of different pathways to the ground state. Because the statistical probability for each of these pathways is well defined and invariant, the spectrum of gamma rays emitted will also be well defined and invariant with environment. FIG. 7 shows a simplified picture of the gamma-ray emission from 29Si following neutron capture by 28Si. The gamma-ray cascades here always start from the same excited state at 8473 keV. The emission spectrum is independent of environment since the gamma ray cascades all start from the same excited energy level and proceed with well-defined and invariant statistical probabilities. The excitation energy here comes not from the kinetic energy of the neutron, but rather from the neutron separation energy of the product nucleus, i.e. from the deficit in the mass energy of the product nucleus (29Si) versus the mass energy of 28Si plus a free neutron.

Figure 8:
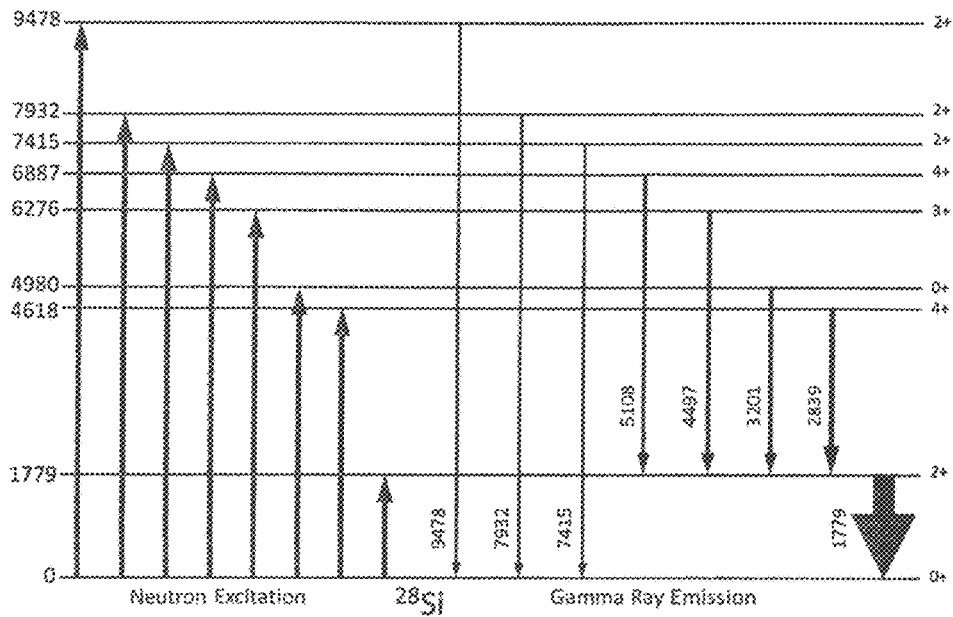
FIG. 8 is an energy band diagram illustrating gamma-ray emission following fast-neutron inelastic scattering in silicon.

Also note that the situation is much more complicated for gamma rays excited by inelastic neutron interaction because the initial excited state of the product nucleus will depend on the kinetic energy of the neutron at the time of the reaction as well as on the kinematics of the reaction. So the inelastic neutron interaction can conceivably excite nearly every available energy level in the product nucleus. FIG. 8 shows just a few of the available energy levels in 28 Si that could be excited by inelastic neutron interaction. In this case, the gamma-ray cascades that produce measurable gamma rays will start from many different excited states. In this case, it is reasonable to assume that the distribution of these excited energy levels is environmentally dependent, especially so on the hydrogen concentration. Thus, it is reasonable to infer that the spectrum of gamma rays emitted from inelastic neutron interaction changes with variations in the environment at the point of creation of the measured gamma rays, such as changes in porosity of the bulk media.

Figure 9:
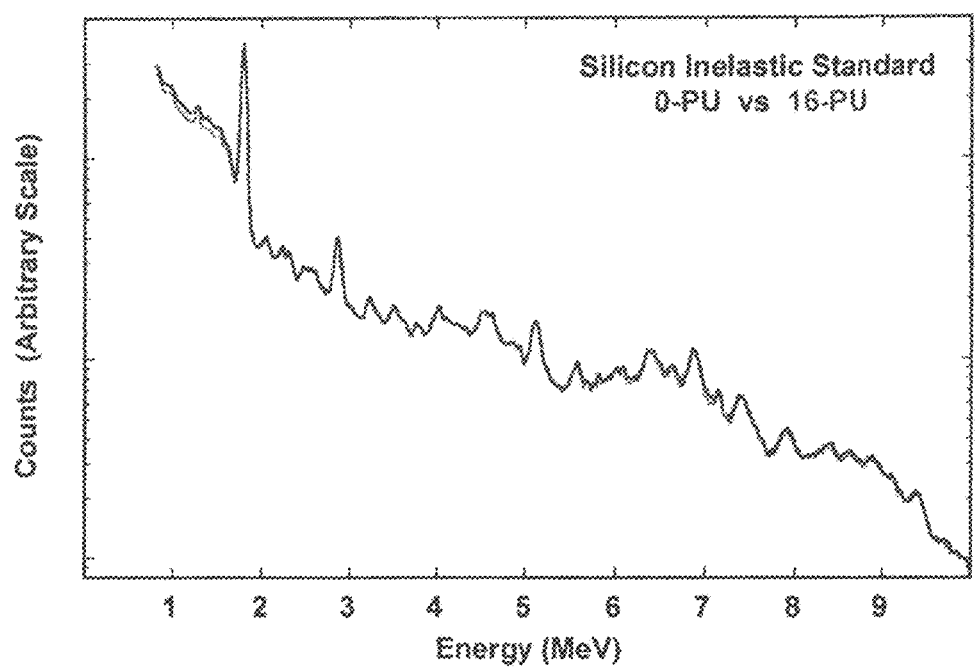
FIG. 9 is a plot illustrating two standard gamma-ray spectra resulting from fast-neutron inelastic scattering in silicon at 0% porosity/0-PU and at 16% porosity/16-PU, respectively.
Figure 10:
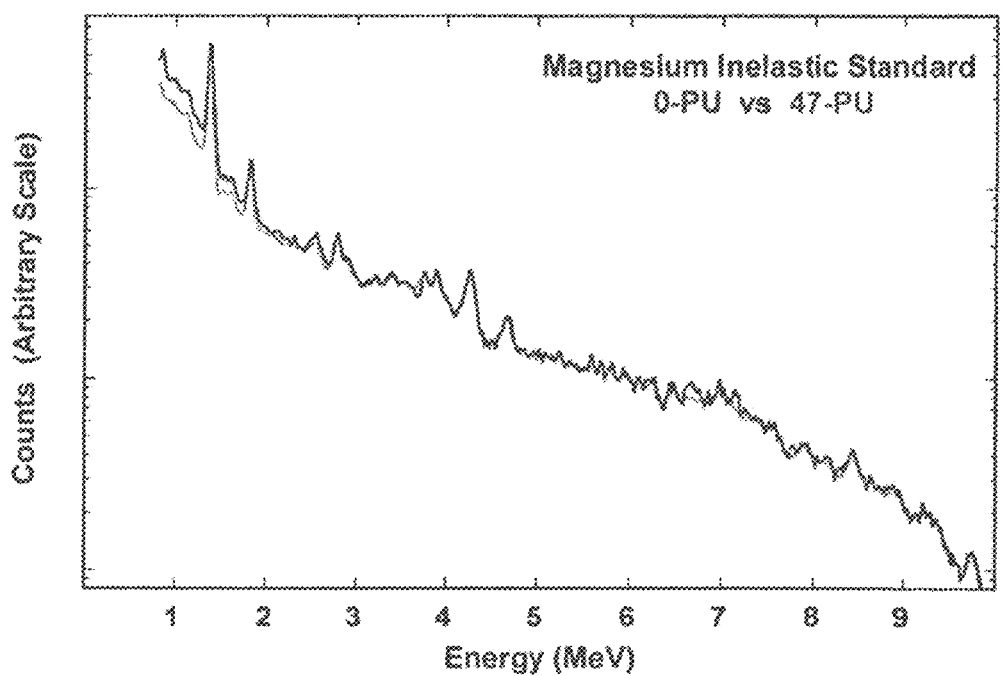
FIG. 10 is a plot illustrating two standard gamma-ray spectra resulting from fast-neutron inelastic scattering in magnesium at 0% porosity/0-PU and at 47% porosity/47-PU, respectively.
Figure 11:
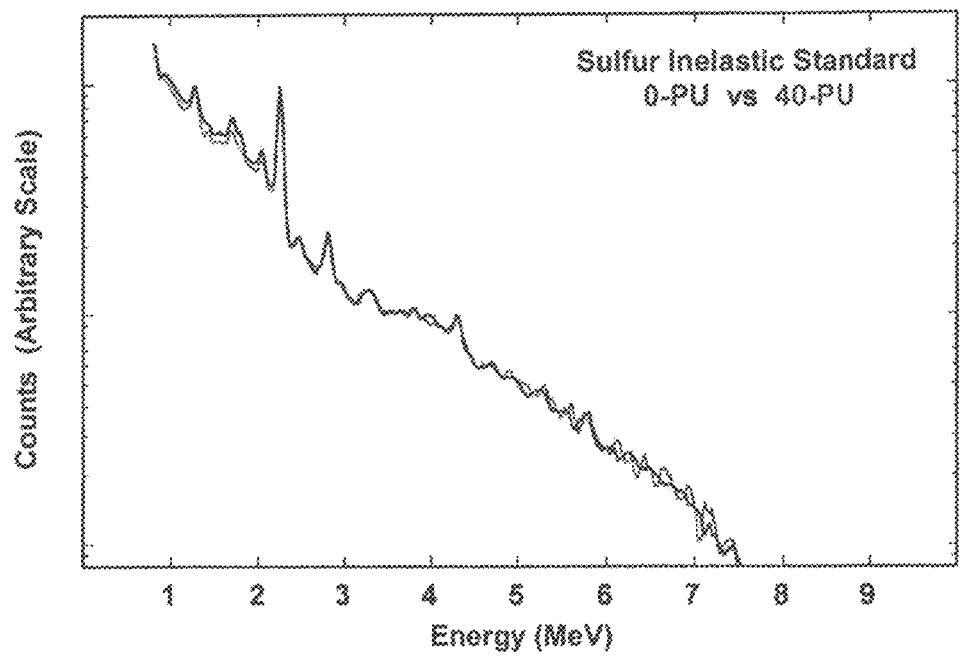
FIG. 11 is a plot illustrating two standard gamma-ray spectra resulting from fast-neutron inelastic scattering in sulfur at 0% porosity/0-PU and at 40% porosity/40-PU, respectively.

FIGS. 9, 10 and 11 provide evidence that the spectrum of gamma rays emitted from inelastic neutron interaction changes with variations in the porosity of the bulk media at the point of creation of the measured gamma rays. Specifically, FIG. 9 shows the elemental standard spectra measured from inelastic neutron interaction in silicon at two different porosities (0% porosity/0-PU and 16% porosity/16-PU). FIG. 10 shows the elemental standard spectra measured from inelastic neutron interaction in magnesium at two different porosities (0% porosity/0-PU and 47% porosity/47-PU). FIG. 11 shows the elemental standard spectra measured from inelastic neutron interaction in sulfur at two different porosities (0% porosity/0-PU and 40% porosity/40-PU). The common trend here is for the standard spectra extracted from the 0-PU porosity measurements to have relatively more events at energies lower than around 2 MeV. One might presume that these differences could be due to a gamma-ray scattering effect, with less scattering at low porosities because of a shorter path to the detector. However, coupled neutron-gamma Monte Carlo simulations have shown that any porosity dependent scattering effects to be very small.

Figure 12:
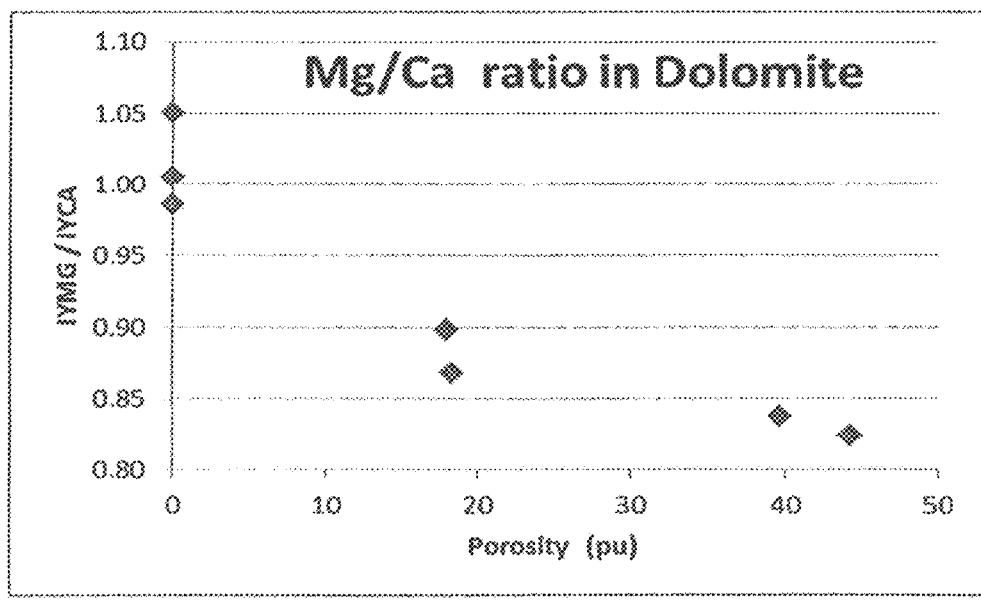
FIG. 12 is a plot illustrating the ratio of the magnesium to calcium gamma-ray spectral contributions arising from fast-neutron inelastic scattering in pure dolomite formations of differing porosities between 0% porosity/0-PU and 50% porosity/50-PU when analyzed with environmentally invariant elemental standards.

Additional evidence for the porosity dependence on the spectrum of gamma rays emitted from inelastic neutron interaction comes from biases in the elemental contributions extracted from the spectra using porosity independent elemental standards. FIG. 12 shows the ratio of the magnesium to calcium gamma-ray spectral contributions arising from inelastic neutron interaction in pure dolomite formations of differing porosities between 0% porosity/0-PU and 50% porosity/50-PU. The elemental standards used were those extracted from mid to high porosity measurements. This spectral yield ratio should be independent of porosity, but clearly it is not.

Figure 13:
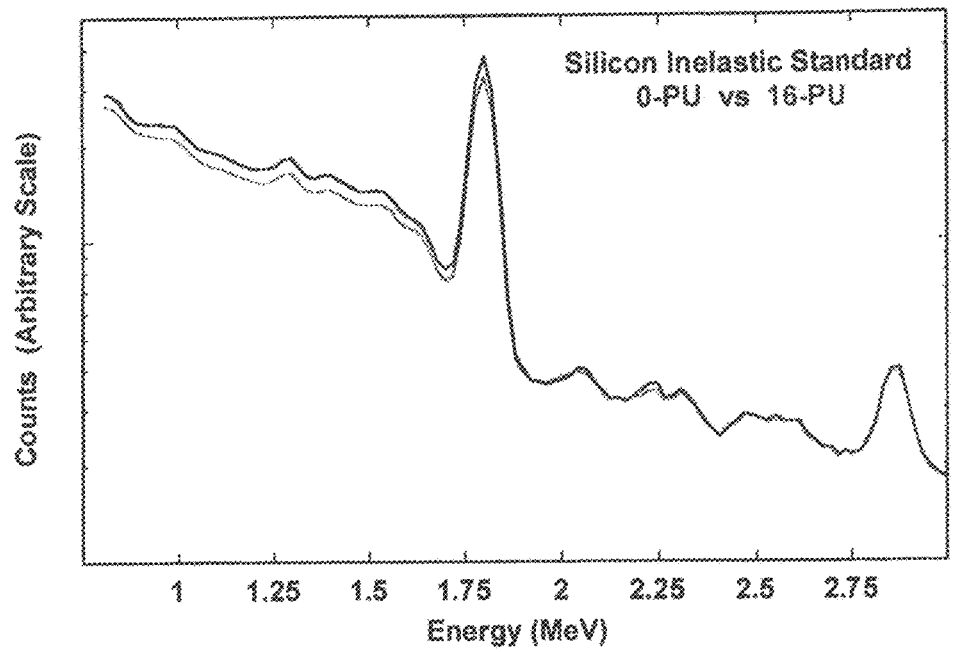
FIG. 13 is a plot illustrating the two standard gamma-ray spectra of FIG. 9 for the low energy bands of the two spectra between 1 and 2.75 MeV.
Figure 14:
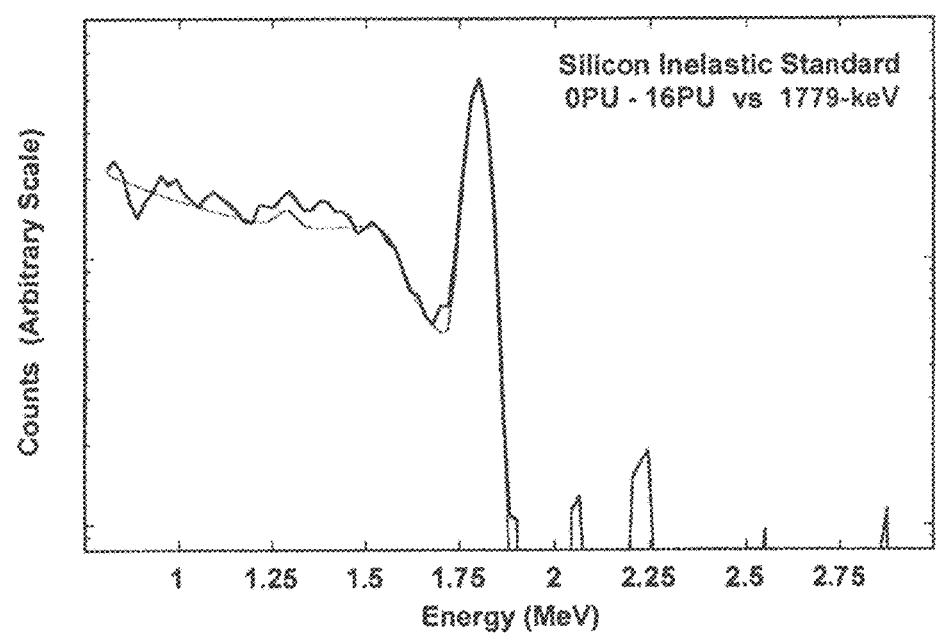
FIG. 14 is a plot illustrating the difference standard spectrum resulting from inelastic neutron interaction in silicon at 0% porosity/0-PU relative to a baseline standard spectrum resulting from inelastic neutron interaction in silicon at 16% porosity/16-PU for the low energy bands of the difference standard spectrum between 1 and 2.75 MeV; the plot also shows the 1779-keV gamma ray for the low energy bands between 1 and 2.75 MeV.

FIG. 13 examines in more detail the spectral difference between the elemental standard spectra measured from inelastic neutron interaction in silicon of 0% porosity/0-PU and 16% porosity/16-PU. Note that the 16% porosity/16-pu silicon standard agrees with the baseline 0% porosity/0-pu silicon standard quite well at higher energies, only starting to diverge at around the 1779-keV peak. The contention here is that the main difference between the two is that elemental standard spectra for silicon at the 0% porosity/0-pu simply includes more contribution from the 1779-keV gamma ray. This contention can be confirmed by evaluation of FIG. 14, which compares the difference in the two silicon elemental standard spectra standards to the detector response to a single 1779-keV gamma ray. Specifically, FIG. 14 shows the difference standard spectra resulting from inelastic neutron interaction in silicon at 0% porosity/0-PU relative to a baseline standard spectra resulting from inelastic neutron interaction in silicon at 16% porosity/16-PU as well as the 1779-keV gamma ray. With reference back to FIG. 8, the 1779-keV gamma ray comes from the lowest excited energy level in 28 Si, which could be excited directly by relatively low energy neutrons. The physical justification for the spectral difference then is that at low porosities, the detection of gamma rays excited by low energy neutrons is more likely, perhaps because these low energy neutrons can travel closer to the detector.

Since the elemental spectra of gamma rays emitted from inelastic neutron interaction changes with porosity, and presumably they change continuously, the elemental concentrations derived from Eqn. 4 will not be correct unless the elemental standards are changed continuously with porosity. Indeed, FIG. 12 shows how incorrect those concentrations could be when using porosity-independent standards. Possible solutions to account for these different environmental effects are described above with respect to FIGS. 2, 3 and 4.

Figure 15:
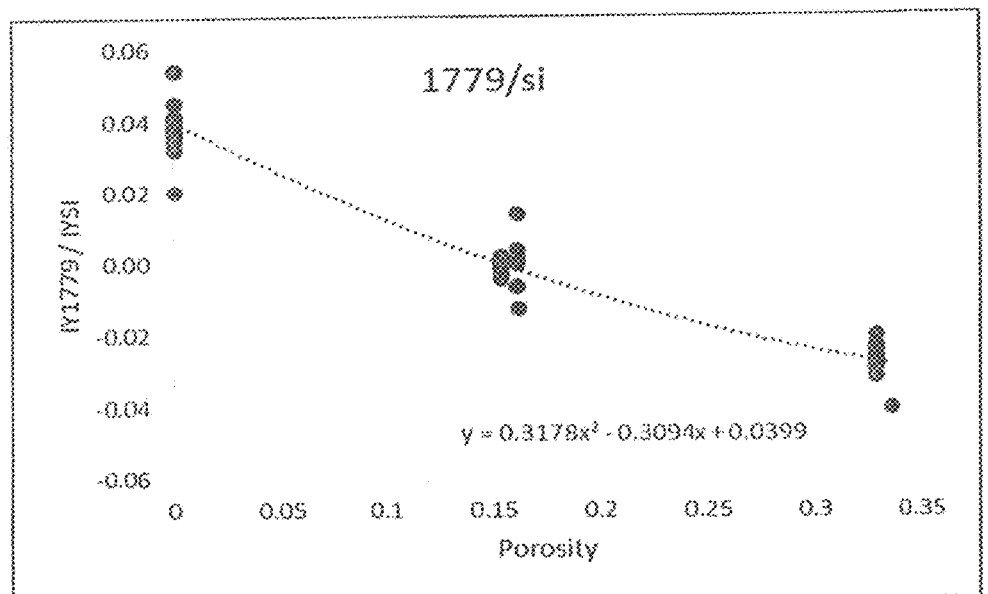
FIG. 15 is a plot showing the results of an analysis that employs difference standard spectra for silicon of many different laboratory sandstone formations of variable porosity and borehole size. Plotted is the ratio of the difference standard yield for silicon to the yield from the 16-PU silicon standard.

For example, in an embodiment following the operations of FIG. 2, the proper porosity dependent standard for each given constituent element can be derived as a simple linear combination of a baseline standard spectra at a high-porosity and the difference standard spectra for the porosity of the environment that is being measured. FIG. 15 shows the result of an analysis that employs difference standard spectra for silicon of many different laboratory sandstone formations of variable porosity and borehole size. In this example, the difference standard spectra was given by the detector response to a single 1779-keV gamma ray as shown in FIG. 14. The measurement times were sufficiently long to negate the degradation in statistical uncertainty due to the additional highly-correlating standard. The relative difference standard contribution is clearly dependent on porosity and can be predicted reasonably accurately. Most of the scatter in the points is due to borehole size variations, which could be included in the predictive algorithm.

The ratio plotted in FIG. 15 corresponds to $\alpha_1$ in Eqn. 6 for the element Si, with the difference standard being just the detector response to a single 1779-keV gamma ray. The prediction of $\alpha_1$ based on porosity as shown here would allow for the computation of the bias vectors as outlined in FIG. 3.

In another embodiment following the operations of FIG. 4, to the extent that the weighting matrix (W) does not change much with porosity of the environment, the bias vectors for each constituent element can be computed from the difference standard spectra for the constituent elements as shown in the table below for Si, Mg, and S difference standard spectra. The bias vectors are equal to the predicted difference yield (i.e. $\alpha_j X_j$) times these redistribution factors.

|  | C | O | Si | Ca | Fe | S | Mg | Al | TB | DB | NaCl | Ba |
|---|---|---|---|---|---|---|---|---|---|---|---|---|
| Si Dif | −0.043 | 0.020 | 2.479 | 0.482 | −1.729 | 0.216 | −0.515 | −0.094 | −3.279 | −0.391 | 1.756 | 2.098 |
| Mg Dif | −0.178 | 0.014 | −0.470 | −0.777 | −0.937 | 0.261 | 4.128 | 0.044 | −5.570 | −0.291 | 1.797 | 2.978 |
| S Dif | −0.099 | 0.103 | 0.059 | −0.400 | −0.879 | 3.703 | 0.119 | 0.433 | −0.880 | −0.281 | −1.098 | 0.217 |

Figure 16:
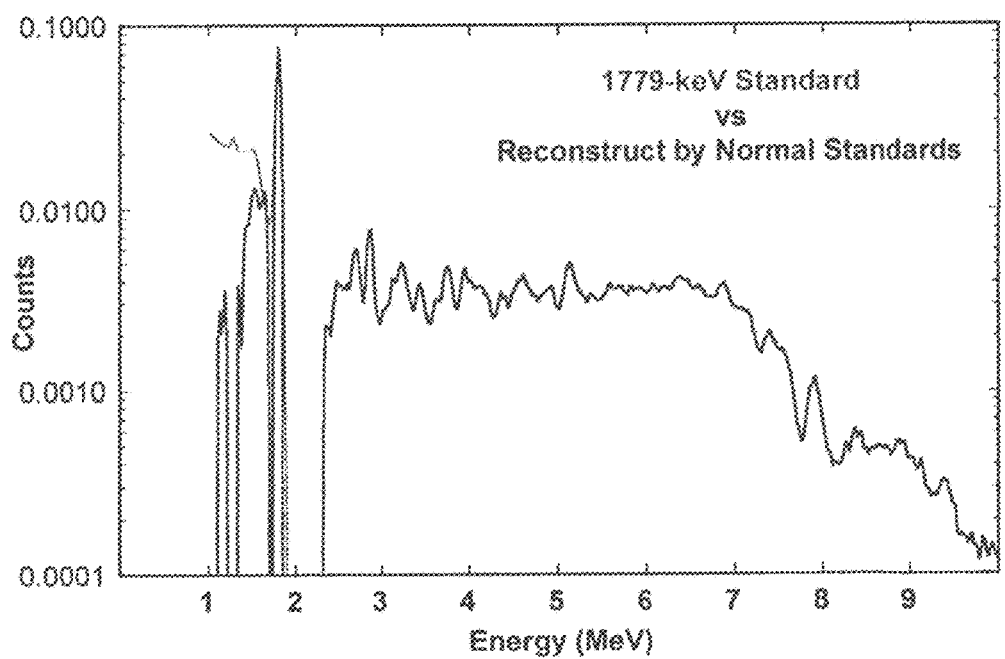
FIG. 16 is a plot showing a composite spectrum reconstructed from a linear combination of elemental baseline standard spectra that best fits a 1779-keV gamma ray as well as the spectrum for the 1779-keV gamma ray itself.

Furthermore, it can be instructive to look spectrally at the solution to Eqn. 4. FIG. 16 shows the best attempt to reconstruct the shape of the extra 1779-keV gamma ray using the elemental baseline standard spectra alone. Since this was a unit spectrum, the elemental contributions are the redistribution factors shown in the first line of the above table. The silicon baseline standard spectra itself is the only one that can come close to matching the 1779-keV spectrum in the vicinity of the peak, but since it contains many more events at higher and lower energy, the other standards are making a valiant attempt to compensate by adding wildly varying contributions in both positive and negative directions, which in turn is the reason we have biases for elements other than silicon.

Figure 17:
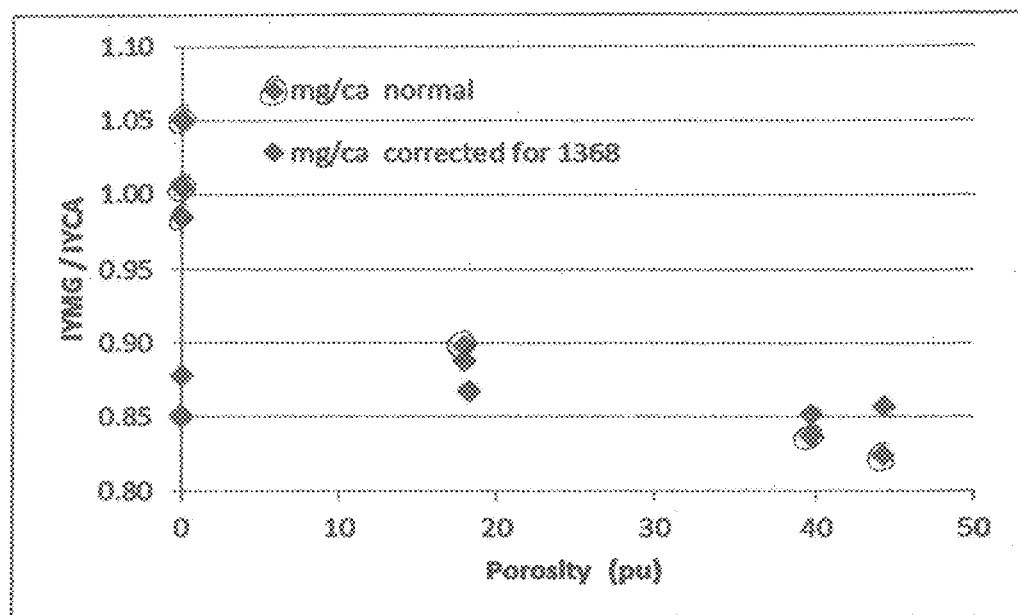
FIG. 17 is a plot showing Mg/Ca yield ratios for measurements in pure dolomite with and without applying adjustment to the standard spectrum for magnesium that account for changes to porosity of the dolomite.

When the technique as described above is applied to the magnesium contribution, i.e. from creating a magnesium difference standard and a predictive algorithm for the porosity dependence of its contribution, the original magnesium bias is removed. FIG. 17 shows the Mg/Ca yield ratios for measurements in pure dolomite with and without applying the correction.

Figure 18:
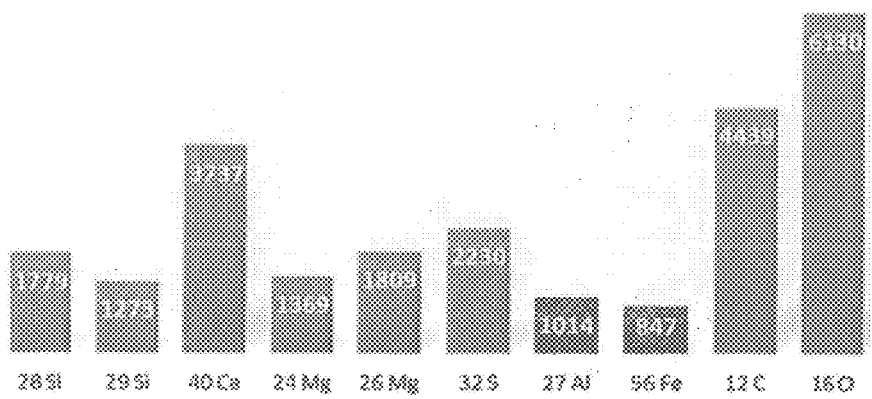
FIG. 18 is a bar graph that shows the lowest energy levels for the elements most commonly measured via neutron inelastic scattering.

It may be reasonable to assume that the porosity effect on gamma ray spectra excited by inelastic neutron interaction is caused by a change in the spatial distribution of low-energy neutrons, which can excite only low-energy states. In this case, one can speculate that the effect is measurable only when the lowest available energy level in the nucleus is below about 2.5-3 MeV. FIG. 18 shows the lowest energy levels for the elements most commonly measured via neutron inelastic scattering. Note that this assumption may not follow for calcium, which has a lowest available energy level greater than 3 MeV.

To the extent used in the description and claims, phrases in the form of "at least one of [a] and [b]" should be construed as being disjunctive, i.e., encompassing arrangements that include [a] but not [b], arrangements that include [b] but not [a], and arrangements that include [a] and [b].

There have been described and illustrated herein several embodiments of a method and system for analyzing constituent elements in bulk media that employs neutron-induced gamma-ray spectroscopy that accounts for environmental dependence of inelastic gamma-ray emission spectra. While particular embodiments have been described, it is not intended that the claims and invention as set forth herein be limited thereto, as it is intended that the claim and invention be as broad in scope as the art will allow and that the specification be read likewise. It will therefore be appreciated by those skilled in the art that yet other modifications could be made to the provided embodiments without deviating from its spirit and scope as claimed.

What is claimed is:

1. A method for analyzing constituent elements in a bulk media comprising:

emitting neutrons into the bulk media to produce inelastic neutron interaction in the bulk media;

deriving a gamma-ray spectrum resulting from the inelastic neutron interaction in the bulk media using a data processing system; and using the data processing system to store a first set of baseline standard spectra corresponding to the constituent elements and perform spectral analysis that processes the stored first set of baseline standard spectra and the derived gamma-ray spectrum to determine a number of yield coefficients for the constituent elements as part of the bulk media;

wherein the spectral analysis determines a change in an environmental condition between the stored first set of baseline standard spectra and the derived gamma-ray spectrum, selects a second set of difference standard spectra or a vector of contribution biases derived from difference standard spectra based on the determined change in environmental condition between the stored first set of baseline standard spectra and the derived gamma-ray spectrum, and uses the stored first set of baseline standard spectra and the selected second set of difference standard spectra or the selected vector of contribution biases to account for the determined change in the environmental condition between the stored first set of baseline standard spectra and the derived gamma-ray spectrum.

2. A method according to claim 1, further comprising:
storing the yield coefficients in computer memory for subsequent analysis.

3. A method according to claim 1, wherein:
the environmental condition is selected from the group consisting of porosity of the geological formation and borehole size in the geological formation.

4. A method according to claim 1, wherein:
the second set of difference standard spectra represents a change to the first set of baseline standard spectra resulting from change in an environmental condition that affects detected gamma-rays that result from the inelastic neutron interaction in the bulk media.

5. A method according to claim 1, wherein:
the spectral analysis selects a second set of difference standard spectra that matches the determined change in environmental condition between the stored first set of baseline standard spectra and the derived gamma-ray spectrum, uses the selected second set of difference standard spectra to adjust the stored first set of baseline standard spectra to produce a set of adjusted standard spectra, and then uses the adjusted standard spectra to determine the combination of spectra for the constituent elements that best fits the derived gamma-ray spectrum resulting from the inelastic neutron interaction in the bulk media.

6. A method according to claim 1, wherein:
the spectral analysis uses the stored first set of baseline standard spectra to determine the combination of spectra for the constituent elements that best fits the derived gamma-ray spectrum resulting from the inelastic neutron interaction in the bulk media in order to derive a weighting matrix W and a set of yield coefficients for the constituent elements, selects a second set of difference standard spectra that matches the determined change in environmental condition between the stored first set of baseline standard spectra and the derived gamma-ray spectrum, generates a vector of contribution biases for each one of the constituent elements from the selected second set of difference standard spectra and the weighting matrix W, and uses the vector of contribution biases for the constituent elements to adjust the set of yield coefficients for the constituent elements.

7. A method according to claim 6, wherein:
the vector of contribution biases for the constituent elements is derived by combining the selected second set of difference standard spectra, the weighting matrix W and the stored first set of baseline standard spectra.

8. A method according to claim 1, wherein:
the spectral analysis stores pre-computed vectors of contribution biases for each one of the constituent elements as derived from difference standard spectra, uses the stored first set of baseline standard spectra to determine the combination of spectra for the constituent elements that best fits the derived gamma-ray spectrum resulting from the inelastic neutron interaction in the bulk media in order to derive a set of yield coefficients for the constituent elements, selects one of the stored pre-computed vectors of contribution biases that matches the determined change in environmental condition between the stored first set of baseline standard spectra and the derived gamma-ray spectrum, and uses the selected one vector of contribution biases to adjust the set of yield coefficients for the constituent elements.

9. A method according to claim 8, wherein:
the pre-computed vectors of contribution biases are derived by combining a predefined weighting matrix W and a unit difference standard spectra.

10. A method according to claim 1, wherein:
the constituent elements are selected from the group including carbon, oxygen, silicon, calcium, iron, sulfur, magnesium, aluminum, barium, and sodium chloride.

11. A method according to claim 1, wherein:
the environmental condition represents porosity of the bulk media.

12. A method according to claim 1, wherein:
the environmental condition represents an aspect of the measurement environment.

13. A method according to claim 1 as part of downhole analysis of a geological formation.

14. A system for analyzing constituent elements in a bulk media comprising:
a neutron source configured to emit neutrons into the bulk media to produce inelastic neutron interaction in the bulk media;
a gamma-ray detector for deriving a gamma-ray spectrum resulting from the inelastic neutron interaction in the bulk media; and
a data processing system configured to store a first set of baseline standard spectra corresponding to the constituent elements and perform spectral analysis that processes the stored first set of baseline standard spectra and the derived gamma-ray spectrum to determine a number of yield coefficients for the constituent elements as part of the bulk media;
wherein the spectral analysis determines a change in an environmental condition between the stored first set of baseline standard spectra and the derived gamma-ray spectrum, selects a second set of difference standard spectra or a vector of contribution biases derived from difference standard spectra based on the determined change in environmental condition between the stored first set of baseline standard spectra and the derived gamma-ray spectrum, and uses the stored first set of baseline standard spectra and the selected second set of difference standard spectra or the selected vector of contribution biases to account for the determined change in the environmental condition between the stored first set of baseline standard spectra and the derived gamma-ray spectrum.

15. A system according to claim 14, wherein:
the data processing system is further configured to storing the yield coefficients in computer memory for subsequent analysis.

16. A system according to claim 14, wherein:
the environmental condition is selected from the group consisting of porosity of the geological formation and borehole size in the geological formation.

17. A system according to claim 16, wherein:
the second set of difference standard spectra represents a change to the first set of baseline standard spectra resulting from change in an environmental condition that affects detected gamma-rays that result from the inelastic neutron interaction in the bulk media.

18. A system according to claim 17, wherein:
the spectral analysis performed by the data processing system selects a second set of difference standard spectra that matches the determined change in environmental condition between the stored first set of baseline standard spectra and the derived gamma-ray spectrum, uses the selected second set of difference standard spectra to adjust the stored first set of baseline standard spectra to produce a set of adjusted standard spectra, and then uses the adjusted standard spectra to determine the combination of spectra for the constituent elements that best fits the derived gamma-ray spectrum resulting from the inelastic neutron interaction in the bulk media.

19. A system according to claim 17, wherein:
the spectral analysis performed by the data processing system uses the stored first set of baseline standard spectra to determine the combination of spectra for the constituent elements that best fits the derived gamma-ray spectrum resulting from the inelastic neutron interaction in the bulk media in order to derive a weighting matrix W and a set of yield coefficients for the constituent elements, selects a second set of difference standard spectra that matches the determined change in environmental condition between the stored first set of baseline standard spectra and the derived gamma-ray spectrum, generates a vector of contribution biases for each one of the constituent elements from the selected second set of difference standard spectra and the weighting matrix W, and uses the vector of contribution biases for the constituent elements to adjust the set of yield coefficients for the constituent elements.

20. A system according to claim 19, wherein:
the vector of contribution biases for the constituent elements is derived by combining the selected second set of difference standard spectra, the weighting matrix W and the stored first set of baseline standard spectra.

21. A system according to claim 17, wherein:
the spectral analysis performed by the data processing system stores pre-computed vectors of contribution biases for each one of the constituent elements as derived from difference standard spectra, uses the stored first set of baseline standard spectra to determine the combination of spectra for the constituent elements that best fits the derived gamma-ray spectrum resulting from the inelastic neutron interaction in the bulk media in order to derive a set of yield coefficients for the constituent elements, selects one of the stored pre-computed vectors of contribution biases that matches the determined change in environmental condition between the stored first set of baseline standard spectra and the derived gamma-ray spectrum, and uses the selected one vector of contribution biases to adjust the set of yield coefficients for the constituent elements.

22. A system according to claim 21, wherein:
the pre-computed vectors of contribution biases are derived by combining a predefined weighting matrix W and a unit difference standard spectra.

23. A system according to claim 14, wherein:
the constituent elements are selected from the group including carbon, oxygen, silicon, calcium, iron, sulfur, magnesium, aluminum, barium, and sodium chloride.

24. A system according to claim 14, wherein:
the environmental condition represents porosity of the bulk media.

25. A system according to claim 14, wherein:
the environmental condition represents an aspect of the measurement environment.

26. A system according to claim 14, wherein at least the neutron source and gamma-ray detector are part of a downhole tool for analysis of a geological formation.

27. A system for analyzing constituent elements of a geological formation comprising:
a neutron source configured to emit neutrons into the geological formation to produce inelastic neutron interaction in the geological formation;
a gamma-ray detector for deriving a gamma-ray spectrum resulting from the inelastic neutron interaction in the geological formation; and
a data processing system configured to store a first set of baseline standard spectra corresponding to the constituent elements and perform spectral analysis that processes the stored first set of baseline standard spectra and the derived gamma-ray spectrum to determine a number of yield coefficients for the constituent elements as part of the geological formation;
wherein the spectral analysis determines a change in an environmental condition between the stored first set of baseline standard spectra and the derived gamma-ray spectrum, selects a second set of difference standard spectra or a vector of contribution biases derived from difference standard spectra based on the determined change in environmental condition between the stored first set of baseline standard spectra and the derived gamma-ray spectrum, and uses the stored first set of baseline standard spectra and the selected second set of difference standard spectra or the selected vector of contribution biases to account for the determined change in the environmental condition between the stored first set of baseline standard spectra and the derived gamma-ray spectrum.

28. A system according to claim 27, wherein:
the constituent elements are selected from the group including carbon, oxygen, silicon, calcium, iron, sulfur, magnesium, aluminum, barium, and sodium chloride.

29. A system according to claim 27, wherein:
the environmental condition represents porosity of the geological formation.

30. A system according to claim 27, wherein:
the environmental condition represents borehole size in the geological formation.

* * * * *